United States Patent [19]

Pews et al.

[11] 3,950,306
[45] Apr. 13, 1976

[54] TRIS-(POLYHALOPHENOXY)-S-TRIAZINE FLAME RETARDANTS

[75] Inventors: R. Garth Pews; Jeffrey A. Gunsher, both of Midland, Mich.

[73] Assignee: The Dow Chemical Company, Midland, Mich.

[22] Filed: Oct. 1, 1974

[21] Appl. No.: 510,963

Related U.S. Application Data

[62] Division of Ser. No. 261,353, June 9, 1972, Pat. No. 3,843,650.

[52] U.S. Cl. .................... 260/45.8 NT; 106/15 FP
[51] Int. Cl.² ........................................ C08J 3/20
[58] Field of Search........... 260/45.8 NT; 106/15 FP

[56] References Cited
UNITED STATES PATENTS

| | | | |
|---|---|---|---|
| 3,001,954 | 9/1961 | Buchholz et al............ | 260/45.8 NT |
| 3,275,592 | 9/1966 | Oswald et al. ..................... | 260/45.8 |
| 3,361,847 | 1/1968 | Zimmerman et al. ....... | 260/45.8 NT |
| 3,530,127 | 9/1970 | Biland et al. ................ | 260/45.8 NT |
| 3,729,471 | 4/1973 | Robin et al. .................. | 260/248 CS |

*Primary Examiner*—V. P. Hoke
*Attorney, Agent, or Firm*—Chessie E. Rehberg; Ralph M. Mellom

[57] ABSTRACT

New organic compounds, comprising tris(polyhalophenoxy)-s-triazines, e.g., tris-(2,4,6-tribromophenoxy)-s-triazine. These new compounds have demonstrated utility as fire retardant additives for various polymers.

6 Claims, No Drawings

TRIS-(POLYHALOPHENOXY)-S-TRIAZINE FLAME RETARDANTS

CROSS-REFERENCE TO RELATED APPLICATION

This application is a division of copending application Ser. No. 261,353, filed June 9, 1972, now issued as U.S. Pat. No. 3,843,650.

BACKGROUND OF THE INVENTION

Various halogenated polyphenyl ethers have been prepared. In general, halogenated compounds are known to be fire retardants and, for example, halogenated diphenyl oxide has been found to be a suitable fire retardant for polyester. Yet compounds which have greater thermal stability and better fire retardancy have been sought.

SUMMARY OF THE INVENTION

It has now been discovered according to the present invention that symmetrical triazines having polyhalophenoxy radicals in the 2,4,6-position of the general formula

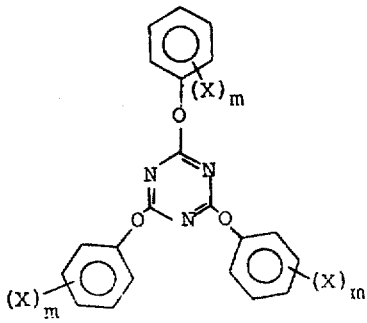

wherein each X is independently Br or Cl, each $m$ is independently an integer of 1 to 5, and more than about 45% by weight of the compound is Br, Cl or a mixture thereof are very desirable fire retardants for a variety of polymers. In the invention, the polymer is physically mixed with the triazine to obtain a product which is resistant to burning while at the same time it substantially retains the desirable properties of the original polymer.

The compounds of the present invention may contain 1 to 5 bromines, 1 to 5 chlorines or a mixture of 1 to 5 bromines and chlorines nucleated on each of the three phenoxy rings. Preferred triazines of the present invention contain only bromine, with those which contain 3 or more bromines on each ring being especially preferred. Of greatest interest because of the special effectiveness as a fire retardant additive are tris-(tribromophenoxy)-s-triazine and tris-(pentabromophenoxy)-s-triazine.

Although the symmetrical triazines of the present invention are preferably those containing only bromine as the halogen, they may be any of those described in the general formula above. They also include such obvious equivalents having inert substituents on the three aromatic nuclei such as F, I, methyl, phenyl, hydroxy, methoxy, nitro, carboxy, acetoxy, cyano or sulfo. The positioning of the substituents on the aromatic rings does not substantially affect the fire retardancy of the compounds.

The triazines of the present invention are desirable as fire retardants for polymers because of their good thermal stability and lower volatility.

The compounds of the invention may suitably be added to any compatible resin in amounts sufficient to give the desired degree of fire retardancy. The amount required to give a desirable fire retardant polymer varies widely depending upon the particular polymer, the shape of the polymer in the final form and the fire retardancy desired. Thus, the polymer compositions of the invention broadly contain a fire retarding amount of the compositions of the invention. By "fire retarding amount" is meant that amount of the fire retardant compositions of the invention which when present in the polymer measurably reduces the tendency of the polymer to burn. In preferred compositions, about 1 to 20% by weight of the polymer is the tris-(polyhalophenoxy)-s-triazine, with compositions containing about 5 to 10% by weight of the triazines of the invention being of special interest because of their very good fire retardancy obtained while the desirable properties of the polymers are substantially retained.

Within these ranges and preferred ranges, the particular concentrations and ranges used in a particular mixture will vary depending on the amount of fire retardancy desired at the concessions to the properties of the polymer such as thermal stability, color, toxicity and odor that can be yielded. The determination of these ranges with the above in mind can easily be obtained by those skilled in the art especially with the aid of the examples given below.

Any resin in which a compound of the invention is compatible may be made fire resistant by this invention, with resins containing polyethylene terephthalate and polystyrene being of special interest.

Specifically, one may incorporate the fire retardant synergistic combinations of the invention into the α-olefin polymers such as the homopolymers and copolymers, etc., containing as the major constituent thereof a monovinylidene carbocyclic aromatic polymer, polypropylene, high density polyethylene and the like.

For the purposes of this invention, the term "monovinylidene carbocyclic aromatic polymer" means a homopolymer or copolymer of monovinylidene carbocyclic aromatic monomer in which at least 50 weight percent is polymerized monovinylidene aromatic carbocyclic monomer such as styrene, α-methylstyrene, ar-t-butylstyrene, ar-methylstyrene, ar-chlorostyrene, ar-bromostyrene, and mixtures thereof, and the remainder is polymerized ethylenically unsaturated monomer such as aliphatic conjugated diene, e.g., butadiene and isoprene; α,β-ethylenically unsaturated nitrile, e.g., acrylonitrile, fumaronitrile, and methacrylonitrile; and other α,β-ethylenically unsaturated monomers such as ethyl acrylate, methyl methacrylate, maleic anhydride, vinyl acetate, vinyl benzoate, acrylamide, vinyl methyl ether, vinyl methyl ketone, acrylic acid, methacrylic acid and mixtures thereof. Small amounts of cross-linking monomers such as divinyl benzene are also suitably employed in the monovinylidene carbocyclic aromatic polymer.

Preferably, the monovinylidene carbocyclic aromatic polymer is a rubber modified polymer, e.g., high impact polystyrene containing from about 2 to about 25 weight percent of a diene rubber such as polybutadiene, elastomeric styrene/butadiene copolymer inclusive of the random, block and graft varieties, and polyisoprene or an ethylene/propylene rubber. Also preferred are the so-called ABS resins, i.e., terpolymers of styrene, butadiene and acrylonitrile, and terpolymers of styrene, butadiene and maleic anhydride. It is further understood that unmodified styrene homopolymer, so-called general purpose polystyrene, is suitably employed in the practice of this invention.

Any resin containing a major amount of polypropylene in which the additives are compatible may be made fire retardant by the use of the synergistic combination of any of the compounds represented by Formula (A) with any of the compounds represented by the formulas shown under (B), or mixtures thereof, in the indicated concentrations and ranges.

Homopolymers and copolymers of propylene are well known and readily available on a commercial scale. Homopolymerized polypropylene is usually sold in the form of isotactic polypropylene although it is also available in the atactic form. The polypropylene may be in any form such as solids, fibers and the like. Copolymers of propylene that may be made fire retardant include those prepared by copolymerization of propylene with α-olefins, such as ethylene and butylene, and with other ethylenically unsaturated monomers such as styrene, acrylonitrile, acrylamide, acrylic acid, butadiene and the like. Copolymers of propylene and ethylene are preferred, with copolymers containing at least 80% by weight propylene and homopolymer polypropylene being especially preferred. Such polymers and copolymers of propylene are referred to herein as "polypropylene."

Representative examples of polyesters in which the fire retardant synergistic combinations of the present invention may be employed include polyethylene terephthalate and poly(1,4-cyclohexylenedimethylene terephthalate) sold under the trade name Kodel II. Polyethylene terephthalate is of special interest because of its commercial importance.

Representative examples of polyamides retarded against burning by the present invention include those shown by Kirk-Othmer, Encyclopedia of Chemical Technology, Second Edition, Volume 16, at page 2, with nylon-6 and nylon-6,6 being of special interest because of their commercial availability.

In instances wherein foamed articles of suitable polymers such as the α-olefins are desired, a blend of the aforementioned essential ingredients and a blowing agent, preferably a solid material, which blend is stable at temperatures used for blending the ingredients, is prepared in a manner to provide a uniform dispersion of the fire retardant additive and the blowing agent in the polymer. The resulting composition may then be molded in a form such as a cavity mold at temperatures sufficient to activate the blowing agent. Other conventional techniques for making foamed polymers are also suitably employed.

The fire retardant additives incorporated into resins may contain various stabilizers, such as tridecylphosphite, barium-cadmium soaps and organo tin compounds or other materials which inhibit discoloration. Although stabilizers are generally unnecessary with the pure fire retardants of the invention, commercial grades of the fire retardants sometimes contain impurities which cause discoloration at high temperatures. With proper stabilization or purified additives, however, fire retardant polystyrene, for example, may be molded or extruded at temperatures above 200°C. without degradation or discoloration.

Although the compounds of the invention are effective fire retardants when used alone, other known additives may be used in addition to or in partial substitution for these compounds. Representative examples of other additives include antimony oxide, a peroxide, triethylphosphate, dibromoneopentyl glycol or other brominated compounds.

The polymers containing the fire retardants are conveniently prepared by making a melt of the polymer and the triazine compound and mixing the liquids in the desired proportions until an essentially homogeneous mixture is obtained. The mixture is then processed in the same manner as the original polymer, for example, the mixture is cooled, ground to a powder and molded into the desired form. The novel fire retardants claimed herein may also be added to the various polymers by any known method.

SPECIFIC EMBODIMENTS

EXAMPLE 1 — Preparation of tris-(2,4,6-tribromophenoxy)-s-triazine

To a reactor equipped with a stirrer and reflux condenser was added an ethanol solution of sodium tribromophenoxide prepared from tribromophenol (116 g., 0.35 mole) and sodium hydroxide (14 g.). Cyanuric chloride (18.4 g., 0.1 mole) was dissolved in anhydrous tetrahydrofuran and added to this ethanol solution. The reaction mixture was refluxed for two hours, cooled and the white crystalline solid filtered, digested in ethanol, filtered and dried to give a product having a melting point of 215°-218°C.

Elemental analysis for $C_{21}H_6Br_9N_3O_3$ was calculated to be C, 23.60; H, 0.56; Br, 67.40; N, 3.93. Found: C, 24.14; H, 0.77; Br, 67.20; N, 4.07.

EXAMPLE 2

Tris-(pentabromophenoxy)-s-triazine was prepared from pentabromophenol and cyanuric chloride using the process described in Example 1, above. The compound was found to have a melting point of 320°-325°C.

EXAMPLES 3-6 and Comparative Example A — Fire Retardancy in Saturated Polyester Using the screening method ASTM-D2863, tris-(2,4,6-tribromophenoxy)-s-triazine was tested as a fire retardant in saturated polyester. In the test procedure, a mixture of polyethylene terephthalate and the desired amount of the triazine compound to give the indicated percentage of bromine were mixed at 265°C. using a Brabender mixer. After mixing for several minutes the mixture was then removed from the mill and ground to a powder in a Waring Blendor. A sample was then fabricated by molding it at a pressure of 20,000 psi at 300°C. on a fiberglass support. The hot sandwich was then placed in a second press and a light pressure (100–300 psi) was applied while the sample cooled to room temperature. When the sample was cold it was removed and cut into strips ½ inch × 7 inches × ⅛ inch. The samples were then burned in a limiting oxygen index test (LOI as described in Combustion and Flame, 10, 135 (1966)). The higher the LOI, the lower fire retardant the sample is. The results of these tests with the tribromophenoxy triazine as compared to the pure polyester are shown in Table I.

TABLE I

| Fire Retardancy in Saturated Polyester Using Tris-(2,4,6-tribromophenoxy)-s-Triazine | | | |
|---|---|---|---|
| Wt. % Br | Gm Cpd | Wt. Cpd. + Polyester | LOI |
| 0 | 0 | 75 g. | 0.205 |
| 3 | 3.33 | 75 g. | 0.264 |
| 5 | 5.55 | 75 g. | 0.287 |
| 7 | 7.77 | 75 g. | 0.311 |
| 10 | 11.85 | 80 g. | 0.324 |

EXAMPLES 7–10 and Comparative Example B — HLT-15 Intermittent Flame Test Using Tris-(2,4,6-tribromophenoxy)-s-triazine in Saturated Polyester The fire retardant effect of various levels of the tribromophenoxy-s-triazine in polyethylene terephthalate molded with two pieces of fiberglass mat was tested by a modified HLT-15 Intermittent Flame Test. The tests are the same as the HLT-15 specification except that in the modified test, the samples were suspended at a 45° angle with a wire holder and the flame was applied vertically underneath the sample. This test is designed to determine the self-extinguishing quality of resins in the form of fiberglass mat reinforced laminates. The material tested herein was ⅛ × ½ × 7 inches long. The edges were smooth and rectangular. The application of the flame was by use of a 7/16 inch tirrell burner. The flame was adjusted to 1½ inch inner blue cone with a flame height of approximately 5 inches. Care was taken to have the access of the burner at an angle of 90° from horizontal and all tests were made under draft-free conditions. The specimens were clamped at a 45° angle in a wire holder as indicated and the tip of the inner blue cone of the flame just touched the lower edge of the ½ inch dimension of the specimen. Each of the ignitions were made at a slightly higher point on the sample so as to not to attempt to burn an area which consisted mainly of the fiberglass support only. The total difference in distance was 1 inch to 2 inches. The results of these tests are shown in Table II. Higher HLT-15 scores indicate a higher degree of fire retardancy. Burning time of over 120 seconds were considered continuous and recorded as "CB."

TABLE II

| Modified HLT-15 Tests on Polyethylene Terephthalate Containing Various Amounts of Tris-(2,4,6-tribromophenoxy)-s-triazine | | |
|---|---|---|
| Example | Wt. % Br | Mod. HLT-15 Score |
| Comp. B | 0 | 0 |
| 7 | 3 | CB |
| 8 | 5 | 16 |
| 9 | 7 | 15 |
| 10 | 10 | 84 |

EXAMPLE 11

With a polystyrene resin, 12% based on the weight of the polystyrene of tris-(pentabromophenoxy)-s-triazine was blended along with 3.5 weight percent of $Sb_2O_3$. The mixture was then molded into strips and the fire retardancy determined by Underwriter Laboratory Test, "Subject 94," Dec. 9, 1959. The rating was self-extinguishing-II, which classification is applied under UL-94 to materials where the duration of flaming or glowing combustion of vertical specimens after application of the test flame does not exceed 25 seconds, but which materials drip flaming particles or droplets that burn only briefly during the test.

In the same manner as described in the examples above, other polyhalophenoxy symmetrical triazines, such as tris-(2,4,6-chlorophenoxy)-s-triazine, tris-(pentachlorophenoxy)-s-triazine, and mixed triazines such as 2-(2,4,6-bromophenoxy), 4-(2,4,6-chlorophenoxy), 6-(pentabromophenoxy)-s-triazine, the latter made by reacting cyanuric acid with equimolar proportions of tribromophenol, trichlorophenol and pentabromophenol. These and similar compounds and mixtures thereof are used to make polymers fire retardant such as tris-(tribromodimethyl)-s-triazine, 2-(tribromofluorophenoxy), 4-(tribromophenoxy), 6-(pentachlorophenoxy)-s-triazine, tris-(phenyltribromophenoxy)-s-triazine, 2-(tetrabromonitrophenoxy), 4-(trichlorocarboxyphenoxy), 6-(tribromophenoxy)-s-triazine, and bis-2,4-(dibromosulfophenoxy), 6-(trichloroacetoxyphenoxy-s-triazine.

Aslo in the same manner as shown by the examples above for polyethylene terephthalate, other saturated polyesters such as Kodel polyesters, and nylons such as nylon-6,6, nylon-4,10 and nylon-4,6 are made fire retardant by the addition of these halogenated phenoxy triazines. Similarly, other resins of styrene containing 0.1–20% by weight of other fire retardant additives of the present invention may be extruded or molded without discoloration at temperatures of 220°C. to produce a fire resistant resin.

The tests employed herein to demonstrate suppressed ignition properties of the polymer(s) are all standard tests and accurately demonstrate the ignition or burning characteristics of the polymers when exposed to small scale ignition sources according to the test employed. It is well recognized by those skilled in this art and should be clearly understood by others, however, that all known organic polymers will burn when subjected to a sufficiently intense heat source (whether or not they contain a fire retardant additive).

We claim:

1. A composition comprising a polymer containing as a fire retardant a small but fire retarding amount of a compound of the general formula

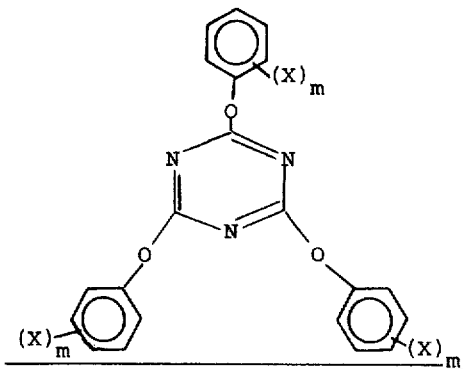

wherein each X is independently Br or Cl, each $m$ is independently an integer of 1 to 5, and at least about 45% by weight of the compound is Br, Cl or a mixture thereof.

2. The composition of claim 1 wherein the polymer is polystyrene.

3. The composition of claim 1 wherein the polymer is polyethylene terephthalate.

4. The composition of claim 1 wherein the concentration of the compound of claim 1 ranges from about 1 to about 20% by weight based on the weight of the polymer.

5. The composition of claim 1 wherein the concentration of the compound of claim 1 ranges from about 5 to about 10% by weight based on the weight of the polymer.

6. The composition of claim 5 wherein the compound of claim 1 is tris-(tribromophenoxy)-s-triazine or tris-(pentabromophenoxy)-s-triazine.

* * * * *